United States Patent [19]
Lutz

[11] Patent Number: 5,218,652
[45] Date of Patent: Jun. 8, 1993

[54] DEPOLARIZER FOR ELECTROMAGNETIC RADIATION

[75] Inventor: Dale R. Lutz, Maplewood, Minn.

[73] Assignee: Minnesota Mining and Manufacturing Company, Saint Paul, Minn.

[21] Appl. No.: 751,731

[22] Filed: Aug. 29, 1991

[51] Int. Cl.⁵ .............................................. G02B 6/10
[52] U.S. Cl. ....................................... 385/11; 385/27
[58] Field of Search ............................. 385/11, 1–10, 385/43, 30, 27

[56] References Cited

U.S. PATENT DOCUMENTS

| | | | |
|---|---|---|---|
| 4,136,929 | 1/1979 | Suzaki | 385/30 |
| 4,389,090 | 6/1983 | LeFevre | 385/11 |
| 4,469,397 | 4/1984 | Shaw et al. | 385/27 |
| 4,473,270 | 9/1984 | Shaw | 385/30 |
| 4,479,701 | 10/1984 | Newton et al. | 385/30 X |
| 4,558,920 | 12/1985 | Newton et al. | 385/30 |
| 4,572,608 | 2/1986 | Mechiznki et al. | 350/96.15 |
| 4,695,844 | 9/1987 | Houchangnia | 343/781 CA |
| 4,906,068 | 3/1990 | Olson et al. | 385/43 |
| 4,922,309 | 5/1990 | Sekiwa et al. | 356/300 |
| 4,968,112 | 11/1990 | Lovely et al. | 385/11 |

FOREIGN PATENT DOCUMENTS

3149616 12/1981 Fed. Rep. of Germany .
461399 7/1988 U.S.S.R. .

OTHER PUBLICATIONS

*Annals of Observatory of Paris Meudon Section.*
*Journal of the Optical Society of America,* vol. 41, No. 12, "A Monochromatic Depolarizer".
*Journal of Lightwave Technology,* vol. LT1, No. 1, "Performance of Lyot Depolarizers with Birefringent Single-Mode Fibres".
*Soviet Technical Physics Letters,* vol. 9, No. 7.
*Journal of Lightwave Technology,* vol. LT3, No. 1, "Theory of Laser Phase Noise in Recirculating Fiber-Optic Delay Lines".
*Journal of Lightwave Technology,* vol. LT4, No. 2, "New Fiber-Optic Depolarizer".
*Electronics Letters,* vol. 23, No. 12, "Monomode Fibre Polarisation Scrambler".
*Electronics Letters,* vol. 16, No. 20, "Single-Mode Fibre Fractional Wave Devices and Polarisation Controllers".
*Electronics Letters,* vol. 27, No. 1, "New Polarization-Insensitive Direction Scheme Based on Fiber Polarisation Scrambling".
*Optics Letters,* vol. 16, No. 6, "Depolarized source for fiber-optic applications".

Primary Examiner—John D. Lee
Assistant Examiner—Phan T. Heartney
Attorney, Agent, or Firm—Gary L. Griswold; Walter N. Kirn; Stephen W. Buckingham

[57] ABSTRACT

A depolarizer operates by splitting light traveling along an optical fiber into two sub-beams. One of the sub-beams is inserted into a recirculation loop, where it has its polarization state altered. The light in the recirculation loop is then reinserted into the fiber at a position prior to that at which the splitting occurred.

18 Claims, 1 Drawing Sheet

DEPOLARIZER FOR ELECTROMAGNETIC RADIATION

BACKGROUND OF THE INVENTION

Many of the light sources commonly used in fiber optic applications, particularly with single mode fibers, produce highly-polarized light. This is particularly true of lasers. However, in many situations unpolarized light is desired. For example, some light detection systems have a sensitivity that is dependent, in part, on the polarization of the light they are detecting. Alternatively, if a polarizing fiber, such as that described in commonly-assigned U.S. patent application Ser. No. 381,038, filed Jul. 17, 1989 is to be used with a polarized source, the amount of light emerging from the fiber will be related to the orientation of the polarization of the light entering with respect to the birefringence axis of the fiber. Thus measurements of the light intensity emerging from a system utilizing polarizing fiber must take into account such orientation. If the light entering the polarizing fiber is unpolarized, however, clearly such orientation is not a factor.

In order to appreciate the prior art depolarization systems, it must be understood that unpolarized light is not light lacking polarization. Rather it is light in which the instantaneous polarization state changes extremely rapidly so that there is no net preference for any one polarization state. One method that has been used previously for producing effectively unpolarized light is to split a polarized beam into a plurality of subbeams and then recombine them so as to produce a varying pattern of polarization states across the face of a detector. Because this involves a spatial average across a comparatively large area, it is not generally useful with single mode optical fibers.

A second approach provides a time average rather than a spatial average. This is done by varying the birefringence of an optical fiber through which the light is travelling at a rate greater than the response time of a detector to be used. While such an approach is clearly useful with optical fiber, it requires the additional complexity of an active system. A passive depolarizer would be preferable.

U.S. Pat. No. 4,968,112 (Lovely et al.) utilizes a lithium niobate waveguide. Such a waveguide will retard light having one polarization state relative to light having a different polarization state. The waveguide is chosen such that it is long enough that the retardation is sufficient to destroy the phase coherence of the two states. A problem with such a system is that if the coherence time of the light source is long, the required waveguide will be excessively long.

SUMMARY OF THE INVENTION

According to the invention, a depolarizer utilizes a fiber optic coupler. The coupler has first and second input fibers and first and second output fibers and a coupling region. The second output fiber and the second input fiber are positioned so that light emerging from the second output fiber is inserted into the second input fiber in order to form a recirculation loop. Means for modifying the polarization state of the light is provided in the recirculation loop.

Alternatively stated, light traveling along a first optical fiber is split into two sub-beams. One sub-beam remains in the first fiber and the other sub-beam enters a recirculation loop. The polarization state of the light in the recirculation loop is altered and the light is reinserted into the first fiber at a position prior to the position at which the splitting occurred.

DETAILED DESCRIPTION OF A PREFERRED EMBODIMENT

Figure 1:
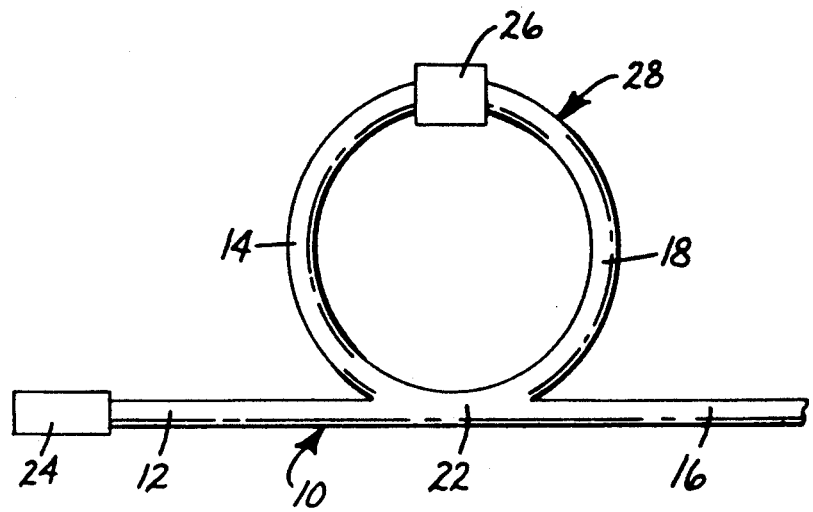
FIG. 1 shows a depolarizer according to the invention.

In the present invention an optical fiber coupler, 10, includes input optical fibers 12 and 14, and output optical fibers 16 and 18. These meet in a coupling region 22. Light from a source of polarized light, 24, is inserted into input fiber 12. The light could be directly coupled from polarized light source 24 or could be coupled through another optical fiber. In the coupling region 22 the light is split between output fibers 16 and 18. Output fiber 18 is connected to input fiber 14 by splice 26 to form loop 28. The light circulating in loop 28 thus reenters coupling area 22 and is again redistributed between fibers 16 and 18.

Splice 26 may be any splice commonly used with single mode optical fibers including fusion splices. Alternatively the splice is not absolutely necessary. In experimental versions the ends of input fiber 14 and output fiber 18 were brought close together without a splice. The key feature is that the light traveling in output fiber 18 is inserted into input fiber 14. The use of a splice, however, improves the coupling efficiency and thus the performance of the depolarizer.

In order to provide the desired depolarizing effect, some system for altering the polarization state must be provided in loop 28. In a preferred embodiment this is done by using a polarization-maintaining coupler as fiber optic coupler 10. A polarization-maintaining coupler that will work in the present invention is described in commonly-assigned U.S. Pat. No. 4,906,068. Since the optical fibers of a polarization-maintaining coupler are birefringent, they exhibit what are known as the "fast" and "slow" axes. These correspond to axes along which the fiber exhibits lower and higher indices of refraction, respectively. Splice 26 is arranged such that the fast axis of output fiber 18 makes a nonzero angle with the fast axis of input fiber 14. Of course this means that the slow axis of output fiber 18 makes the same nonzero angle with the slow axis of input fiber 14. Although any nonzero angle can, at least in theory, be made to work, angles less than 45 degrees will generally not provide sufficient polarization mixing to completely depolarize the light. In general, angles in the range of 45 degrees to 90 degrees are preferred. An angle of 90 degrees is probably the easiest to describe mathematically and thus to design.

The length of the fiber in loop 28 is preferably greater than the coherence length of the light source. While this is not required, the relationship of the phase angles of the light entering the coupler body from input leads 12 and 14 would affect the splice angle, the ratio of the light passing through coupling region 22 that is coupled into each of output fiber 16 and 18, and the length of fiber in loop 28 required for complete depolarization. This dependence on the phase angles is eliminated if the length of the loop is greater than the coherence length of the light source. Thus it is generally preferred that loop 28 have a length longer than the coherence length of the source.

In most prior art fiber optic couplers, a typical desire is that the coupling ratio be 1:1, i.e. half of the light going through coupling body 22 would be coupled into each of output fibers 16 and 18. This is not necessarily desirable in the polarizer of the present invention. Experimentation has shown that generally the light emerging from output fiber 16 will not be completely depolarized if the coupling ratio is 1:1. The exact coupling ratio required will be determined by a variety of factors including particularly the splice angle and the splice efficiency. Generally a coupling ratio of 2:1 appears to provide good results, although in some circumstances coupling ratios as high as 9:1 may be desirable. In each of these the larger fraction of the light is coupled into recirculation loop 28.

In order to determine the desired coupling ratio for fiber optic coupler 10, the following formula may be used:

$$P = |(1-C) - (C^2) \sum_{m=0}^{\infty} (-1)^m (1-C)^m| = |(2-3C)/(2-C)|$$

In these equations P is the degree of polarization of the light and C is the fraction of the light passing through coupling region 22 that is transmitted into output fiber 18. This equation is simplified by assuming that the length of loop 28 is greater than the coherence length of the light source, that the fast axis of output fiber 18 is perpendicular to the fast axis of input fiber 14 and that optical loss is negligible in loop 28 and splice 16. Solving the equation for a degree of polarization of zero, which value corresponds to completely unpolarized light, indicates that output fiber 18 should receive two thirds of the light passing through coupling region 22. This corresponds to a preferred coupling ration of 2:1. Deviation from the above assumptions will generally both complicate the calculations and increase the fraction of the light required to be coupled into output fiber 18. When selecting a coupler based on a calculation such as this, it should be noted that the coupling ratio is often highly wavelength dependent and the coupler should be tested with light of the wavelength to be used.

In an alternative embodiment of the invention, fiber optic coupler 10 need not be a polarization-maintaining coupler. This is advantageous because polarization-maintaining couplers require the use of polarization-maintaining optical fiber, which is generally more expensive than standard fiber, and require care during manufacture to insure that the fast and slow axes of the two fibers that are fused together are properly aligned. Instead, loop 28 has a different polarization shifting device installed therein.

Figure 2:
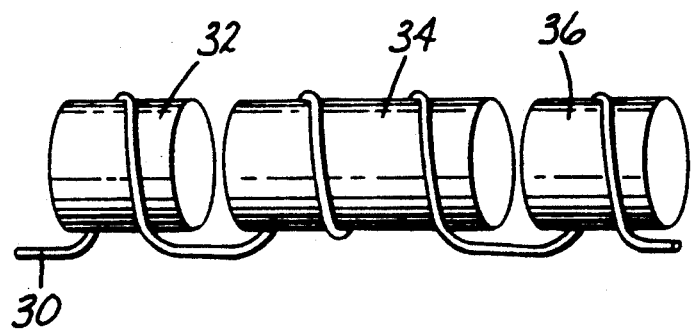
FIG. 2 shows a device for modifying the polarization state of light traveling in an optical fiber, that may be used with the invention.

A polarization-shifting device that will work in the embodiment of the invention that utilizes a nonpolarization-maintaining optical fiber coupler is shown in FIG. 2 and described in more detail by H. C. Lefevre in "Single-Mode Fibre Fractional Wave Devices and Polarization Controllers," *Electronic Letters*, Vol. 16, No. 20, 778 (1980). Such a polarization-shifting device is sometimes known as a 3-retarder. In such a device an optical fiber 30 is wrapped once around a first spool 32, twice around a second spool 34, and once around a third spool 36. These spools are then twisted relative to one another until the orientation of the axes of the stress-induced birefringence created by the loops with respect to one another provides the desired amount of polarization shifting. In the present invention this would occur when the polarization of the light emitted by output fiber 16 is at a minimum. The amount of twisting required will be dependent on the size of the loops, how tightly they are wound, and the wavelength of the light to be used as well as on the properties of the fiber itself. The device of FIG. 2 could be provided any place in loop 28, i.e., in output fiber 18, input fiber 14, or parts of it in both.

What is claimed is:

1. A depolarizer for electromagnetic radiation, said depolarizer comprising an optical fiber coupler having first and second input fibers and first and second output fibers and a coupling region, all of said fibers being joined to said coupling region, said first input fiber serving as a system input and said first output fiber serving as a system output and said second input fiber and said second output fiber both being polarization maintaining fiber and having a birefringence axis and said second input fiber and said second output fiber being positioned such that light exiting said second output fiber will enter said second input fiber so as to form a recirculation loop, said birefringence axis of said second output fiber making a non-zero angle to said birefringence axis of said second input fiber.

2. The depolarizer of claim 1 wherein said second output fiber and said second input fiber are connected by a fiber optic splice.

3. The depolarizer of claim 1 wherein said non-zero angle is in the range of 45 degrees to 90 degrees.

4. The depolarizer of claim 3 wherein said non-zero angle is equal to 90 degrees.

5. The depolarizer of claim 1 wherein said second output fiber and said second input fiber are connected by a fiber optic splice.

6. The depolarizer of claim 1 wherein at least two thirds of the light passing through said coupling region is passed into said second output fiber.

7. A depolarizer for electromagnetic radiation having a coherence length associated therewith, said depolarizer comprising:
    an optical fiber coupler having first and second input fibers and first and second output fibers and a coupling region, all of said fibers being joined to said coupling region, said first input fiber serving as a system input and said first output serving as a system output and said second input fiber and said second output fiber being positioned such that light exiting said second output fiber will enter said second input fiber so as to form a recirculation loop, said recirculation loop having a length greater than said coherence length; and
    means for altering the polarization state of the light in said recirculation loop.

8. The depolarizer of claim 7 wherein said second output fiber and said second input fiber are connected by a fiber optic splice.

9. The depolarizer of claim 7 wherein at least two thirds of the light passing through said coupling region is passed into said second output fiber.

10. The depolarizer of claim 7 where said coupler is a polarization maintaining coupler made of birefringement optical fiber and each of said fibers has a birefringence axis associated therewith.

11. The depolarizer of claim 10 wherein said means for altering the polarization state of the light is formed by positioning the birefringence axis of said second output fiber at a nonzero angle to said birefringence axis of said second input fiber.

12. The depolarizer of claim 11 wherein said second output fiber and said second input fiber are connected by a fiber optic splice.

13. The depolarizer of claim 7 wherein said means for modifying the polarization state comprises a 3-retarder.

14. The depolarizer of claim 13 wherein said second output fiber and said second input fiber are connected by a fiber optic splice.

15. The depolarizer of claim 13 further comprising a source of polarized light having a coherence length associated therewith, said light source being positioned so as to be able to insert light into said first input fiber and said recirculation loop is longer than said coherence length.

16. The depolarizer of claim 15 wherein said second output fiber and said second input fiber are connected by a fiber optic splice.

17. A method of depolarizing a beam of light having a polarization state and a coherence length associated therewith and traveling in a first optical fiber said method comprising the steps of:

splitting said beam into first and second sub-beams, each of said sub-beams retaining said polarization state of said beam, said first sub-beam continuing in said first optical fiber and said second sub-beam being inserted into a recirculation loop having a length greater than said coherence length, said splitting occurring at a first location along said fiber;

modifying said polarization state of said second sub-beam; and reinserting said second sub-beam into said first optical fiber at a position that said beam had passed prior to reaching said first position.

18. A method of depolarizing a beam of light having a polarization state and traveling in a first optical fiber, said method comprising the steps of:

splitting said beam into first and second sub-beams, each of said sub-beams retaining said polarization state of said beam, said first sub-beam continuing in said first optical fiber and said second sub-beam being inserted into a first polarization maintaining optical fiber having a birefringence axis associated therewith;

allowing said light to exit said first polarization maintaining optical fiber and enter a second polarization maintaining optical fiber having a birefringence axis associated therewith, said birefringence axis of said first polarization maintaining optical fiber making a non-zero angle with said birefringence axis of said second polarization maintaining optical fiber; and reinserting said second sub-beam into said first optical fiber at a position that said beam had passed prior to reaching said first position.

* * * * *